US005550386A

United States Patent [19]

Kojima et al.

[11] Patent Number: 5,550,386

[45] Date of Patent: Aug. 27, 1996

[54] METHOD FOR ERASING REMAINING RADIATION IMAGE AND DEVICE

[75] Inventors: Yasushi Kojima; Hiroshi Matsumoto, both of Kanagawa, Japan

[73] Assignee: Fuji Photo Film Co., Ltd., Kangawa, Japan

[21] Appl. No.: 409,680

[22] Filed: Mar. 23, 1995

Related U.S. Application Data

[62] Division of Ser. No. 171,770, Dec. 22, 1993, Pat. No. 5,422,208, which is a continuation of Ser. No. 964,605, Oct. 23, 1992, abandoned.

[30] Foreign Application Priority Data

Oct. 25, 1991 [JP] Japan .................................... 3-306872
Sep. 30, 1992 [JP] Japan .................................... 4-283604

[51] Int. Cl.$^6$ .................................................... G01N 23/04
[52] U.S. Cl. ............................................................ 250/588
[58] Field of Search .............................................. 250/588

[56] References Cited

U.S. PATENT DOCUMENTS 4,439,682 3/1984 Matsumoto et al. .................... 250/588
4,584,483 4/1986 Kato ........................................ 250/588
4,703,178 10/1987 Kageyama .............................. 250/588
5,013,916 5/1991 Umemoto et al. ...................... 250/581
5,065,021 11/1991 Arakawa ................................ 250/588

FOREIGN PATENT DOCUMENTS 59-202099 11/1984 Japan .
4001630 1/1992 Japan ...................................... 430/19

OTHER PUBLICATIONS

Abstract of JP 4–156533, "Radiation Image Erasing Method and Device", Umemoto (5/1992).

*Primary Examiner*—Carolyn E. Fields
*Attorney, Agent, or Firm*—Sixbey, Friedman, Leedom & Ferguson

[57] ABSTRACT

Disclosed is an improvement of a method for erasing a radiation image remaining in a stimulable phosphor sheet which has stored a radiation image and has been irradiated with stimulating rays to read the radiation image. The improvement comprises a first erasing step of irradiating the phosphor sheet with a first erasing light containing a light portion of wavelength in ultraviolet region; and a second erasing step of irradiating the phosphor sheet with a second erasing light containing no light portion of wavelength in ultraviolet region, said second erasing light and said first erasing light being employed in a ratio of amount of light in the range of 15/85 to 45/55. Devices for erasing radiation image appropriately employable in the above-mentioned method are also disclosed.

7 Claims, 5 Drawing Sheets

METHOD FOR ERASING REMAINING RADIATION IMAGE AND DEVICE

This is a divisional of application Ser. No. 08/171,770, filed Dec. 22, 1993, now U.S. Pat. No. 5,422,208; which itself is a continuation of Ser. No. 07/964,605, filed Oct. 23, 1992, now abandoned.

BACKGROUND OF THE INVENTION

1. Field of the Invention

This invention relates to a method for erasing a radiation image remaining in a stimulable phosphor sheet which has stored a radiation image and has been irradiated with stimulating rays to read the radiation image, by exposing the phosphor sheet to an erasing light, and a device employed in the method for erasing the radiation image.

2. Description of Prior Art

Certain phosphors absorb a portion of radiation energy when exposed to a radiation (e.g., X-rays, α-rays, β-rays, γ-rays, ultraviolet rays and electron beam), and give stimulated emission depending upon the amount of stored energy when irradiated with stimulating rays such as visible light. A phosphor showing such property is referred to as stimulable phosphor. There have been already known various stimulable phosphors. As representative examples of the stimulable phosphors, there can be mentioned a barium halide phosphor activated by a rare earth element such as europium, and an oxyhalide phosphor activated by a rare earth element such as cerium. Further, stimulable phosphors in which various additives are incorporated are also known.

A radiation storage sheet is, for instance, prepared by forming the above stimulable phosphor in a shape of a sheet with or without a binder. As a radiation image recording and reproducing method, there is proposed a method that a radiation image of high quality for diagnosis is obtained by processing the above stimulable sheet. In more detail, the method involves the steps of recording information with respect to human body in the radiation stimulable sheet, sequentially scanning the sheet with stimulating rays to release the radiation energy stored in the phosphor as light emission (stimulated emission); photo-electrically detecting the stimulated emission to obtain image signals; and obtaining the radiation image of high quality for diagnosis by processing of the image signals.

In the above radiation image recording and reproducing method, a wavelength region of stimulating rays and a wavelength region of stimulated emission should be separated. For instance, in order to detect effectively an extremely weak light of stimulated emission, a stimulated emission of wavelength within the range of 300 to 500 nm is preferably detected using stimulating rays of wavelength within the range of 600 to 700 nm. Hence, a stimulable phosphor is preferably selected to emit stimulated emission of wavelength within the range of 300 to 500 nm when excited with stimulating rays of wavelength within the range of 600 to 700 nm.

The finally obtained image can be reproduced on hard copy (e.g., in the form of printed image or photographic image), or reproduced on a screen of CRT (Cathode Ray Tube). The stimulable phosphor sheets can be formed in various shapes such as sheet, belt and drum. In the present specification, the term of "sheet" is used to include materials of all of these shapes.

The radiation image stored in the stimulable phosphor sheet can be erased, and therefore the stimulable phosphor sheet has the advantage that it can be used repeatedly. Accordingly, in the radiation image recording and reproducing method, the storage phosphor sheet is generally used repeatedly. In the radiation image recording and reproducing method, if the stimulable phosphor sheet is irradiated with stimulating rays having a sufficiently high energy to read the radiation image, a radiation energy of the stored radiation image information is released completely from the sheet. In practice, however, the stimulating rays used in the reading procedure can release only a portion of the stored radiation image. Thus, in the case of using the stimulable phosphor sheet repeatedly, a remaining portion of the recorded radiation image gives noise in a subsequently recorded radiation image.

Another problem resides in that a stimulable phosphor contains a small amount of radioactive isotopes such as $^{226}$Ra and $^{40}$K and the isotopes emit radiation. The radiation energy emitted by the isotopes is stored in the stimulable phosphor sheet when the phosphor sheet is allowed to stand, and such stored energy also gives noise. Further, the stimulable phosphor stores radiation energy of environmental radiation such as cosmic rays or radiation from isotope in environment. Such radiation energy stored in the stimulable phosphor sheet during standing (referred to as "fog") also gives noise in a subsequently recorded radiation image. Accordingly, the fog should be also erased.

In the radiation image recording and reproducing method which uses the stimulable phosphor sheet repeatedly, it is required to prevent noise caused by the unreleased portion of the previously recorded radiation image, as well as noise caused by the fog. Then, there is already known a method for erasing a remaining radiation image by exposing a stimulable phosphor to light containing a light portion of wavelength region corresponding to that of the stimulating rays to release sufficiently the remaining radiation energy before initiating the next procedure for recording radiation image in the stimulable phosphor sheet.

As the erasing methods, there are known various methods such as a method of using a light source emitting light having a relatively long wavelength (e.g., a tungsten lamp emitting light of a wavelength region of visible light to infrared rays, a halogen lamp or an infrared lamp) as described in Japanese Patent Provisional Publication No. 56(1981)-11392, a method of using a light source emitting light having a relatively short wavelength (e.g., a fluorescent lamp, laser beam source, a sodium lamp, a neon lamp, metal halide lamp or a xenon lamp) as described in Japanese Patent Provisional Publication No. 58(1983)-83839, and a method of conducting the erasing procedure twice comprising a second erasing procedure of exposing a stimulable phosphor sheet having been subjected to a first erasing procedure to light in an amount of light of a ratio of 1/5 to 3/10,000 to an amount of light of a first erasing procedure just before initiating the next recording procedure.

Japanese Patent Provisional Publication No. 59(1984)-202099 proposes a method for erasing the remaining radiation energy by exposing a stimulable phosphor sheet to light of a spectrum having both absorption wavelength and stimulated wavelength of the phosphor. The publication discloses a method of for erasing a remaining radiation energy by exposing a stimulable phosphor sheet to an erasing light containing a light portion in the region of absorption wavelength and stimulated wavelength of the phosphor, and a method for erasing a remaining radiation energy by exposing a stimulable phosphor sheet to the above erasing light and then exposing to a second erasing light, in which a short wavelength not more than 500 nm of the erasing light is cut off by a color glass filter, in the same amount of light as that of the erasing light.

SUMMARY OF THE INVENTION

It has been now discovered that if erasure of a radiation image remaining in a stimulable phosphor sheet is conducted using a light containing no light portion of wavelength in ultraviolet region, a portion of the remaining radiation formed by an electron trapped on a relatively deep energy level is not well erased. In other words, the radiation image can not be satisfactorily erased by irradiation of visible rays. On the other hand, in the case that the erasing is conducted using a erasing light containing a large amount of light of wavelength in ultraviolet region, the erasing light in ultraviolet region itself forms a newly trapped electron in the stimulable phosphor, sheet, although the remaining image of the electron trapped on a deep energy level can be erased. Hence, the radiation image remaining in the stimulable phosphor sheet can not be satisfactorily erased.

Accordingly, it is exceedingly difficult that both an image formed by an electron of an ordinary trapping level and one formed by an electron of a deep trapping level are erased simultaneously and satisfactorily to such an extent that there is no problem in practical use. Particularly, in the case that a procedure of recording of high sensitivity is performed next to an ordinary recording procedure, a radiation image remaining in the stimulable phosphor sheet employed for the ordinary recording procedure gives to a radiation image of high sensitivity adverse effects. Accordingly, it is required that light portion of a short wavelength in the erasing light are carefully controlled in their ratio and amount.

For the above reason, it is desired to develop a method for erasing a radiation image remaining in the stimulable phosphor sheet and a device for the method, in which both an image of an electron on an ordinary trapping level and one of an electron on a deep trapping level are efficiently erased.

There is provided by the present invention a method for erasing a radiation image remaining in a stimulable phosphor sheet which has stored a radiation image and has been irradiated with stimulating rays to read the radiation image, comprising:

- a first erasing step of irradiating the phosphor sheet with a first erasing light containing a light portion of wavelength in ultraviolet region; and
- a second erasing step of irradiating the phosphor sheet with a second erasing light containing no light portion of wavelength in ultraviolet region, said second erasing light and said first erasing light being employed in a ratio of amount of light in the range of 15/85 to 45/55 (second erasing light/first erasing light).

Further, there is provided by the invention a device for erasing a radiation image remaining in a stimulable phosphor sheet which has stored a radiation image and has been irradiated with stimulating rays to read the radiation image, comprising:

- a first erasing light source emitting a light containing a light portion of wavelength in ultraviolet region; and
- a second erasing light source emitting a light containing no light portion of wavelength in ultraviolet, the light to be emitted by said second erasing light source and the light to be emitted by said first erasing light source being in a ratio of amount of light in the range of 15/85 to 45/55.

Furthermore, there is provided by the invention a device for erasing a radiation image remaining in a stimulable phosphor sheet which has stored a radiation image and has been irradiated with stimulating rays to read the radiation image, comprising:

- an erasing light source emitting an erasing light containing both a light portion of wavelength in ultraviolet region and a light portion of wavelength in visible region,
- a movable filter substantially screening a light in ultraviolet region,
- a means moving said filter to interpose between said erasing light source and said stimulable phosphor sheet in a desired time, and
- a control means controlling said erasing light source in such a manner that the light to be emitted by said erasing light source with interposition of said filter and the light emitted by said erasing light source without interposition of said filter is in a ratio of amount of light in the range of 15/85 to 45/55.

The method and device for erasing a radiation image according to the invention are characterized in that the erasing is conducted to a sufficient level as a whole by the following steps of:

- exposing a stimulable phosphor sheet to a first erasing light containing a light portion of wavelength in ultraviolet region (200 to 400 nm) to release an electron located on a deep trapping level in the stimulable phosphor, and
- subsequently, releasing an electron located on a relatively shallow trapping level which is newly trapped by the light of wavelength in ultraviolet region, using a second erasing light containing a light portion of longer wavelength containing no light portion of wavelength in ultraviolet region (containing a light portion of wavelength in the range of 400 to 500 nm and containing no light portion of shorter wavelength in less than 400 nm) in a less amount of light than that of the first erasing light.

Employment of the method for erasing a radiation image according to the invention brings about adequate release of an electron forming a radiation image remaining in a stimulable phosphor sheet, such as electrons trapped on a shallow trapping level through a deep trapping level. Hence, for instance, even if recording of high sensitivity is conducted next to the above erasing operation, a radiation image of high quality can be obtained free from the adverse influence by a remaining radiation image.

Although the trapped electron newly formed by light containing a light portion of wavelength in ultraviolet region may contain an electron on somewhat deeper trapping level, the number of the electrons of such deeper trapping level is extremely few, as compared with the total number of trapped electrons. Accordingly, employment of the erasing method of the invention enables extremely efficient erasing, compared with a conventional erasing method.

DETAILED DESCRIPTION OF THE INVENTION

The invention is explained in more detail below, by referring to the attached drawings.

Figure 1:
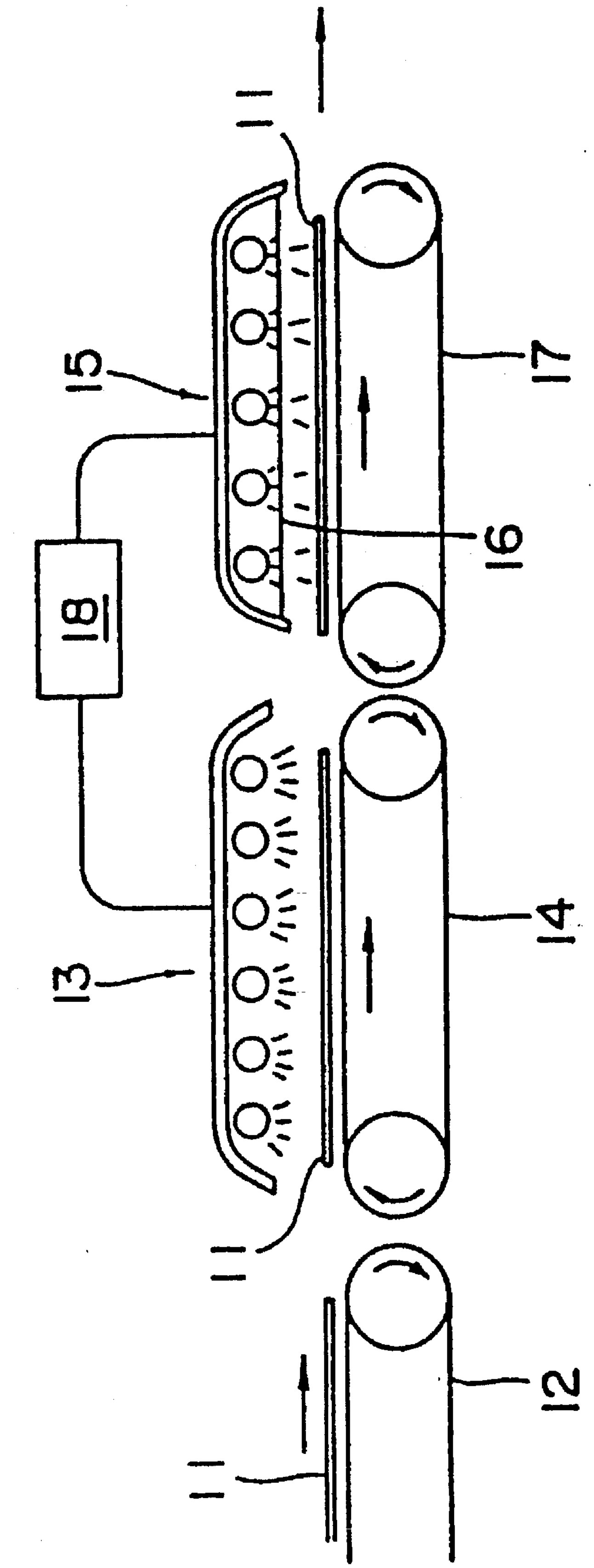
FIG. 1 is a schematic view showing an example of a device for performing the method of the invention.

FIG. 1 shows an example of a device for performing the method of the invention. A stimulable phosphor sheet 11 that has been subjected to a reading procedure is transferred to the position under a first erasing light source 13 by means of a conveyor belt 12. The stimulable phosphor sheet 11 is subjected to erasing procedure by the first erasing light source 14, while it is moved in the direction of the arrow by an endless belt 14. Then, the stimulable phosphor sheet 11 is transferred to the position under a second erasing light source 15. A sharp cut filter 16 is arranged below the second erasing light source. The stimulable phosphor sheet 11 is further subjected to erasing procedure by the second erasing light source, while it is moved in the direction of the arrow by an endless belt 17.

The device for erasing a radiation image has a control means (means for control of light to be emitted by erasing light source) 18 for controlling at least one of the above two light sources in such a manner that the second erasing light emitted by the second erasing light source and the first erasing light emitted by the first erasing light source is in a ratio of amount of light in the range of 15/85 to 45/55 (second erasing light/first erasing light, preferably 20/80 to 40/60).

As the first erasing light source, a lamp emitting a light containing a light portion of wavelength in ultraviolet region is employed. Examples of the lamps include various fluorescent lamps, a mercury vapor lamp, a metal halide lamp and a ultraviolet lamp. In order to conduct erasure of high efficiency, it is desired to use the first erasing light source which gives a light containing not only a light portion of wavelength of ultraviolet region but also a light portion of wavelength in visible region. Such light can be produced by a combination of ultraviolet lamp and a high or low pressure sodium lamp.

Various kinds of fluorescent lamps are known. Examples of the fluorescent lampls include conventional fluorescent lamps such as a white color (W) lamp, a warm white color (WW) lamp, a day light color (D) lamp, an incandescent lamp, a high color rendering white color (W-DL, W-SDL, W-EDL) lamp and cold cathode fluorescent lamps such as a Green color (G) lamp, a blue color (B) lamp, and a high color rendering white color (LCD) lamp. Each of these fluorescent lamps has a wide band spectrum ranging from approx. 300 nm to 750 nm, particularly has high light emission in a wide region centering on 600 nm. A conventional fluorescent lamp has line spectra of high luminance in both the vicinity of 450 nm and that of 550 nm, so that it can be advantageously employed as the first erasing light source.

A mercury lamp has several line spectra of high luminance in the range of 350 nm to 600 nm, so that it can be also advantageously employed as the first erasing light source.

A high pressure sodium lamp gives a wide band spectrum ranging from 500 nm to 700 nm, while it gives a small amount of light in ultraviolet region. Hence, in the case of using the high pressure sodium lamp as the first erasing light source, the high pressure sodium lamp is preferably employed together with a ultraviolet lamp. On the other hand, a low pressure sodium lamp gives line spectra of high luminance in the vicinity of 580 nm, while it does not show sufficient light emission in ultraviolet region. Accordingly, in the case of using the low pressure sodium lamp as the first erasing light source, the high pressure sodium lamp is preferably employed in combination with a ultraviolet lamp.

As examples of the ultraviolet lamp, there can be mentioned a black-white fluorescent lamp (BL), a fluorescent lamp for healthy rays and cold cathode fluorescent lamps (e.g., BLE and ULE), each of which gives band spectra of high luminance in the range of 300 nm to 400 nm.

As the second erasing light source 15, the light sources mentioned above except a ultraviolet lamp can be employed, if necessary, in combination with a filter (particularly a sharp cut filter 16). In more detail, a source showing an emission distribution in both ultraviolet region and a shorter wavelength region than ultraviolet region can be employed as the second erasing light source 15 in combination with a sharp cut filter 16 which cuts off a short wavelength region of not more than about 400 nm. However, a light source (e.g., low pressure sodium lamp) which does not emit light in both ultraviolet region and a shorter wavelength region than ultraviolet region can be employed without a sharp cut filter.

The sharp cut filter, which is defined in JIS-B7113-1975, has spectral characteristics as follows:

(1) a width of inclination of wavelength is not wider than 35 nm; (2) a limitative wavelength of transmission is not wider than 5 nm in terms of a difference between the limitatieve wavelength and a predetermined sharp cut wavelength; (3) a mean value of transmittance in a light transmission region is not less than 85%; and (4) a transmittance in absorption region shorter than a limitative wavelength of absorption by 30 nm or more is not more than 1%.

As a preferred example of the filter employable for the second erasing light source, there can be mentioned a sharp cut filter ("L-42" available for Hoya Glass Co., Ltd.) transmitting only a light portion of a wavelength region of not shorter than approx. 420 nm. Further, a sharp cut filter referred to as "L-40", which transmits only light having longer wavelength than wavelength of approx. 390 nm to 410 nm, can be employed. However, an erasing light emitted by the second erasing light source preferably consists of only light substantially having longer wavelength than 400 nm and more preferably consists of only light substantially having longer wavelength than 420 nm. However, in order to suppress rise or reappearance of a radiation image on the phosphor sheet after being subjected to the erasing procedure, an erasing light to be emitted by the second erasing light source preferably contains a light portion of wavelength in the range of 400 nm to 500 nm. The rise or reappearance of a radiation image is observed after lapse of a certain period of time since the stimulable phosphor sheet is subjected to the erasing procedure in such manner that the remaining radiation image is once weakened and then again is strengthened. Hence, the cut wavelength region of a sharp cut filter used in combination with the second erasing light source is preferred to be in the range of 400 nm to 500 nm. Particularly preferred is that in the range of 420 nm to 480 nm.

If the second erasing light source gives a light having no light portion of wavelength in ultraviolet region or in shorter region than the ultraviolet region, an electron is not newly trapped in the stimulable phosphor of the stimulable phosphor sheet, so that the desired results are attained.

In the above-mentioned device as explained by referring to FIG. 1, the first erasing light source 13 and the second erasing light source 15 are arranged in series. In the method using the device, after the stimulable phosphor sheet 11 is subjected to erasing by the first erasing light source 13, the stimulable phosphor sheet 11 is transferred to the position under the second erasing light source 15 to be erased by the second erasing light source 15 (and the sharp cut filter 16). Instead of this device, a device having light sources comprising a first erasing light sources and second erasing light sources in intermingleded positions can be employed according to the folllowing operations. First, a stimulable phosphor sheet is placed under the intermingled light sources, subsequently the first erasing light sources only are lighted and then the second erasing light sources only are lighted.

Figure 2:
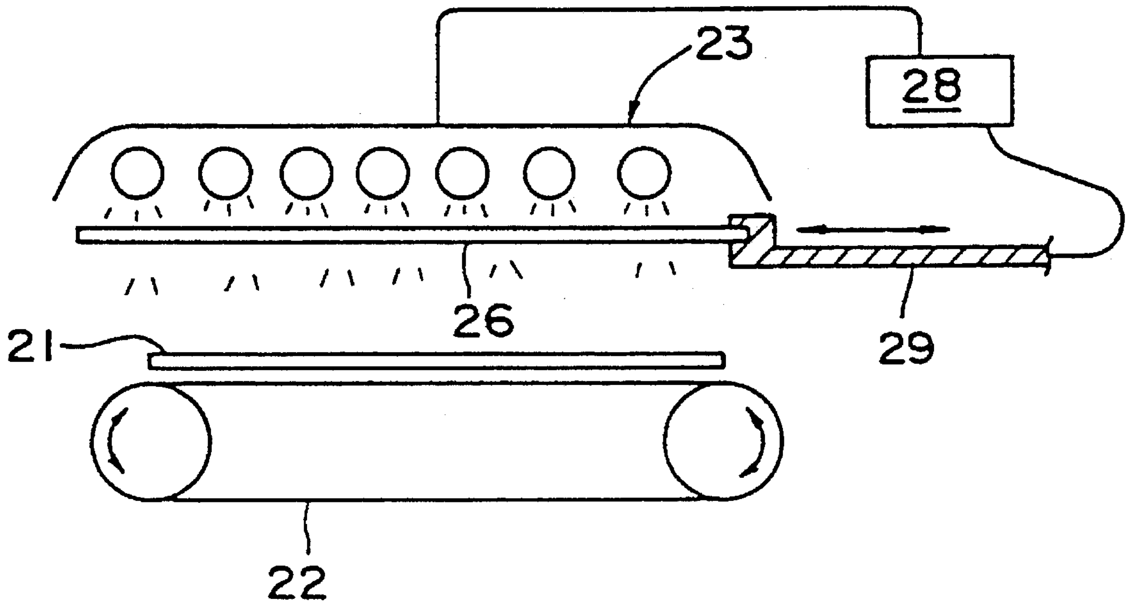
FIG. 2 is a schematic view showing another example of a device for performing the method of the invention.

Further, an erasing device as shown in FIG. 2 can be employed according to the following two erasing procedures comprising a first erasing procedure and a second erasing procedure.

In FIG. 2, the erasing device comprises an erasing light source 23 emitting an erasing light containing both a light portion of wavelength in ultraviolet region and that in shorter region of not shorter than ultraviolet region, a movable sharp cut filter 26 (filter substantially screening a short wavelength-light having a light portion of wavelength in ultraviolet region, i.e., light of wavelength not more than 400 nm), a means 29 moving the filter to interpose between the erasing light source and the stimulable phosphor sheet in a desired time, and a control means (means for control of lighting of erasing light source) 28 controlling in such a manner that the stimulable phosphor sheet after being subjected to reading of a radiation image is irradiated with an erasing light (a first erasing light) emitted by the erasing light source without interposition of the filter and subsequently is irradiated with an erasing light (a second erasing light) emitted by the erasing light source with interposing the filter between the erasing light source and the stimulable phosphor sheet. In this case, a light emitted by the second erasing light source and a light emitted by the first erasing light source is controlled in a ratio of amount of light in the range of 15/85 to 45/55 (second erasing light/initial erasing light, preferably 20/80 to 40/60, by the control means 28.

In the above erasing device, a phosphor storage sheet 21 is placed on a supporting conveyor belt 22 in the position under the erasing light source. First, the erasing light source 23 is lighted under the condition that the sharp cut filter 26 is taken off, subsequently the sharp cut filter is moved to a location under the erasing light source 23 (between the erasing light source 23 and the stimulable phosphor sheet 21) and then again the erasing light source is lighted in such a manner that the predetermined amount of light is irradiated onto the stimulable phosphor sheet 21.

Figure 3:
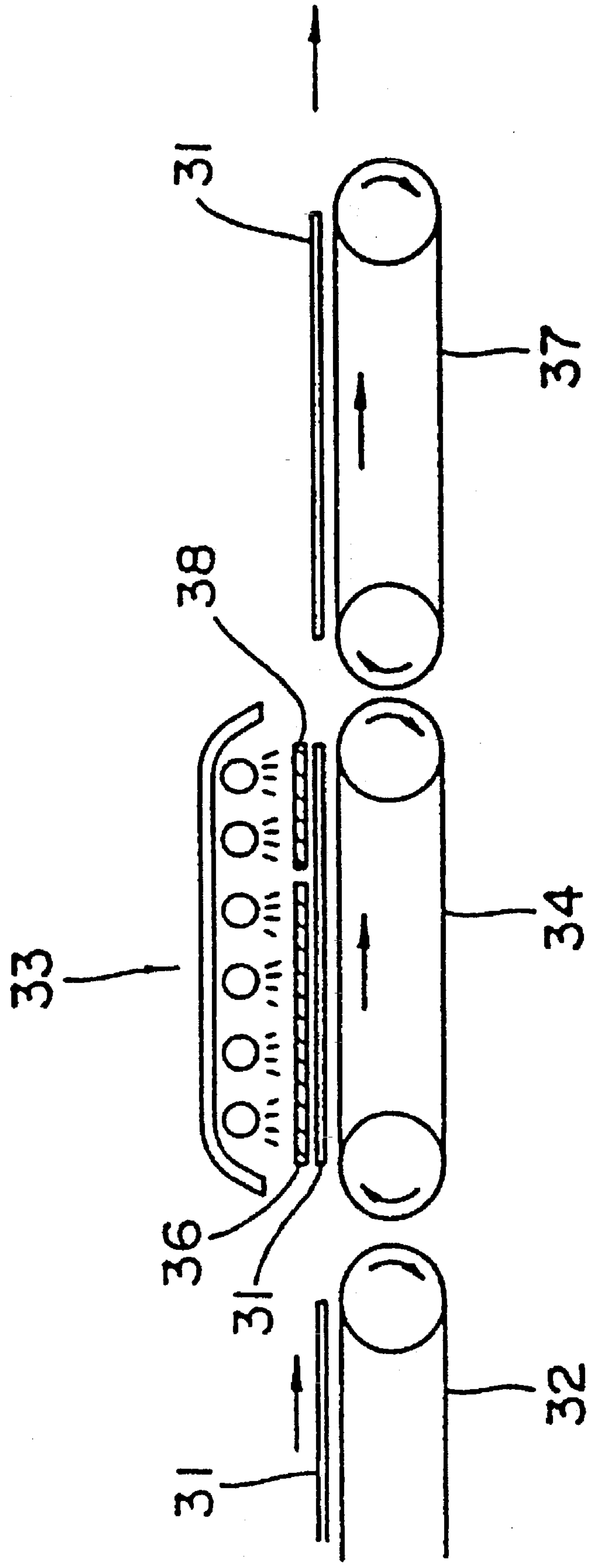
FIG. 3 is a schematic view showing another example of a device for performing the method of the invention.

FIG. 3 shows another example of a device for performing the method of the invention. A stimulable phosphor sheet 31 that has been subjected to a reading procedure is transferred in a position under a erasing light source 33 by means of a conveyor belt 32. The stimulable phosphor sheet 31 is moved in the direction of the arrow by an endless belt 34. The erasing light source 33 in FIG. 3 is a erasing light source (lamp) which emits an erasing light containing both a light portion of wavelength in ultraviolet region and that not shorter than ultraviolet region. Under the erasing light source 33, a transparent filter (filter which transmits a light portion of wavelength in ultraviolet region and that of not shorter than ultraviolet region) 36 and a sharp cut filter (filter substantially screening a light of ultraviolet region, i.e., light of a shorter wavelength of not longer than 400 nm) 38 are arranged along the transferring direction in order. Hence, the stimulable phosphor sheet 31 is subjected to irradiation with light containing both a light portion of wavelength in ultraviolet region and that not shorter than ultraviolet region when the sheet is moved to the position under the transparent filter 36. Subsequently, the stimulable phosphor sheet 31 is subjected to irradiation of light containing no ultraviolet rays when the sheet is located under the sharp cut filter 38. In performing these irradiation, length of the filter (or the number of lamp used, emitting intensity of lamp used, etc.) is required to be adjusted in such a manner that the latter erasing light and the former (initial) erasing light is in a ratio of amount of light in the range of 15/85 to 45/55 (latter erasing light/former erasing light, preferably 20/80 to 40/60).

The stimulable phosphor sheet 31 which has been subjected to the above two-steps irradiation, is then transported from a location under the erasing light source 33 by means of the conveyor belt 37.

Examples of the present invention are given below, but the examples are construed by no means to restrict the invention.

EXAMPLE 1

A whole surface of a stimulable phosphor sheet in which a stimulable phosphor layer (in which $BaFBr_{0.8}I_{0.2}$: $0.001Eu^{2+}$ is dispersed in a polymer binder) was formed on a plastic support, was irradiated with X-rays at a tube voltage of 80 KVp, and subsequently scanned with a stimulating rays (He-Ne laser beam: 633 nm) to release stimulated emission. The stimulated emission light was collected by a photomultiplier through a filter (filter such as "B-390" screening from incidence of stimulating rays) to measure the amount of stimulated emission (the initial luminance of stimulated emission).

Separately, an erasing device which is made up of a, white fluorescence lamp as a first erasing light source and a combination of the white fluorescence lamp and a sharp cut filter (SC-46, cut wavelength: 460 nm) as a second erasing light source, were prepared. The above stimulable phosphor sheet having been scanned with a stimulating rays was first placed under the white fluorescence lamp, which was lighted. The stimulable phosphor sheet was subsequently placed under the second erasing light source, and the white fluorescence lamp was lighted. The storage phosphor sheet was exposed to the light from the lamp through the sharp cut filter. After the twice erasing operations were performed, the stimulable phosphor sheet was scanned with a stimulating rays in the same manner as above to measure the amount of stimulated emission (luminance of stimulated emission after erasing).

Figure 4:
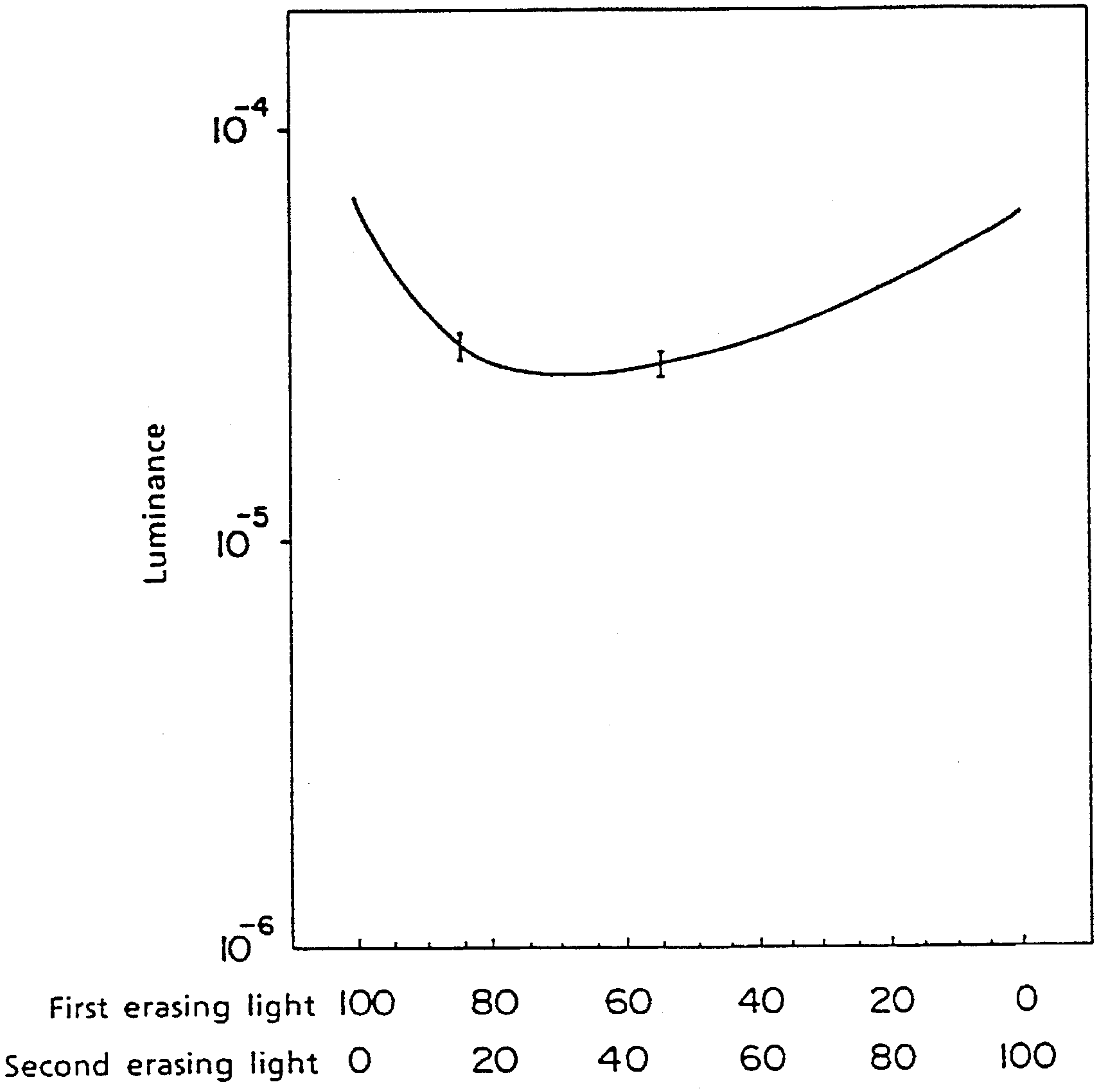
FIG. 4 is a graph of experimental data showing an effect of the erasing method of the invention.

In the above operation, a ratio of the amount of light irradiated on the stimulable phosphor sheet in the first erasing procedure and that in the second erasing-procedure, was varied by controlling the lightning period in each procedure, whereby variation of erasing efficiency depending on the ratio of the amount of light was examined. The results are set forth in FIG. 4. The graph (illustrated in FIG. 4) reveals that an erasing method in which a light source emitting an erasing light containing ultraviolet rays and a light source containing infrared rays and visible light and containing no ultraviolet rays are both employed in order, is advantageous from the viewpoint of the erasing efficiency, as compared with an erasing method using one of the first erasing light and the second erasing light only, even if the total amount of light is adjusted to the same level. Further, in the case that a ratio of the amount of light of the second erasing light to the first erasing light is in the ratio of 15/85 to 45/55 (the second erasing light/the first erasing light) which is defined according to the invention, the erasing method is particularly advantageous.

EXAMPLE 2

The procedure of Example 1 was repeated except for using a filter of cut wavelength of 540 nm (SC-54) instead of the sharp cut filter (SC-46, cut wavelength: 460 nm) used in combination with the second erasing light source, to measure the amount of stimulated emission (luminance of stimulated emission after erasing).

In the operation, a ratio of the amount of light irradiated onto the stimulable phosphor sheet in the first erasing procedure and that in the second erasing procedure, was varied by adjusting the lightning period in each procedure, whereby variation of erasing efficiency depending on the ratio of the amount of light was examined in the same manner as in Example 1. The results are set forth graphically in FIG. 5.

Figure 5:
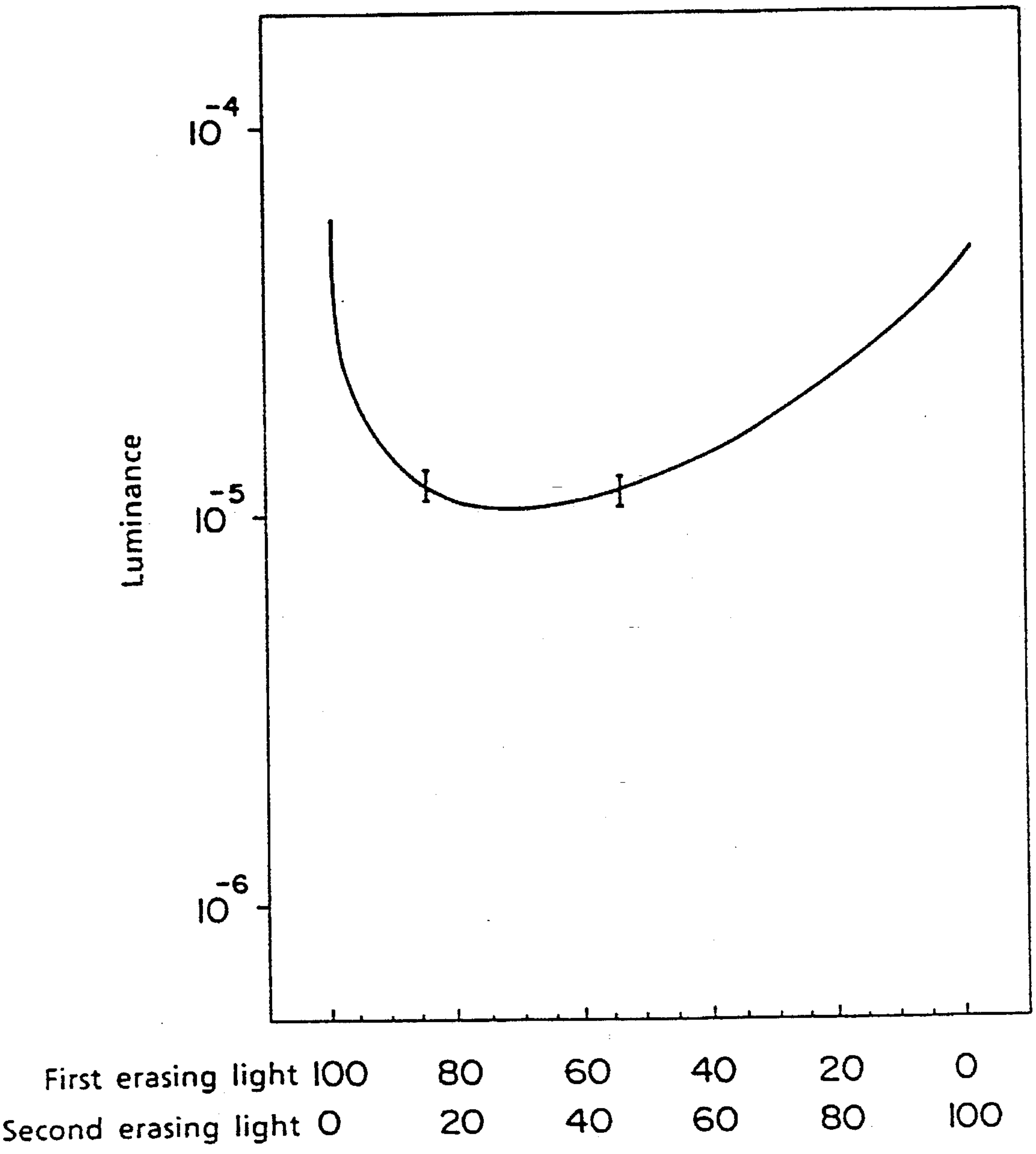
FIG. 5 is a graph of another experimental data showing an effect of the erasing method of the invention.

The graph of FIG. 5 also reveals that an erasing method in which a source emitting an erasing light containing ultraviolet rays and a source containing infrared rays and visible light and containing no ultraviolet rays are both employed in order, is advantageous from the viewpoint of the erasing efficiency, as compared with an erasing method using one of the first erasing light and the second erasing light only. Further, in the case that a ratio of the amount of light of the second erasing light to the first erasing light is in the ratio of 15/85 to 45/55 (the second erasing light/the first erasing light) which is defined according to the invention, the erasing method is particularly advantageous.

We claim:

1. A device for erasing a radiation image remaining in a stimulable phosphor sheet which has stored a radiation image and has been irradiated with stimulating rays to read the radiation image, comprising:

a first erasing light source emitting a light containing a light portion of wavelength in ultraviolet region;

a second erasing light source emitting a light containing a light portion of wavelength longer than ultraviolet and containing no light portion of wavelength in ultraviolet region, which is arranged adjacent to the first erasing light source; and a control means which controls at least one erasing light source such that an amount of light emitted by the second erasing light source relative to an amount of light emitted by the first erasing light source is the range of 20/80 to 45/55.

2. The device for erasing a remaining radiation image claimed in claim 1, wherein the light to be emitted by said second erasing light source and a light to be emitted by said first erasing light source is in a ratio of amount of light in the range of 20/80 to 40/60.

3. The device for erasing a remaining radiation image claimed in claim 1, wherein said second erasing light contains a light portion of wavelength in the range of 400 nm to 500 nm.

4. The device for erasing a remaining radiation image claimed in claim 1, wherein said control means is connected to the first and second light sources.

5. A device for erasing a radiation image remaining in a stimulable phosphor sheet which has stored a radiation image and has been irradiated with stimulating rays to read the radiation image, comprising:

an erasing light source emitting an erasing light containing both a light portion of wavelength in ultraviolet region and that in visible region, a movable filter screening a light in ultraviolet region, a means moving said filter to interpose between said erasing light source and said stimulable phosphor sheet in a desired time, and a control means controlling said erasing light source in such a manner that a light to be emitted by said erasing light source with interposition of said filter and a light to be emitted by said erasing light source without interposition of said filter is in a ratio of amount of light in the range of 20/80 to 45/55.

6. The device for erasing a radiation image claimed in claim 5, wherein the light to be emitted by said erasing light source with interposition of said filter and the light to be emitted by said erasing light source without interposition of said filter is in a ratio of amount of light in the range of 20/80 to 40/60.

7. The device for erasing a radiation image claimed in claim 5, wherein said filter inhibits transmission of a light portion in a wavelength region of not more than 400 nm.

* * * * *